United States Patent [19]
Hardy

[11] Patent Number: 5,988,209
[45] Date of Patent: Nov. 23, 1999

[54] SECURITY DEVICE FOR UTILITY SHUTOFF VALVE

[76] Inventor: Michael P. Hardy, 123 Slater Dr., Wernersville, Pa. 19565

[21] Appl. No.: 09/282,428

[22] Filed: Mar. 31, 1999

Related U.S. Application Data

[60] Provisional application No. 60/080,505, Apr. 2, 1998.

[51] Int. Cl.⁶ .................................................. F16K 31/04
[52] U.S. Cl. ........................ 137/382; 137/368; 137/382.5
[58] Field of Search ................................... 137/327, 328, 137/368, 382, 382.5

[56] References Cited

U.S. PATENT DOCUMENTS

| | | | |
|---|---|---|---|
| 3,453,655 | 7/1969 | Quinones et al. | 137/296 |
| 3,797,286 | 3/1974 | Saporito | 70/169 |
| 4,620,428 | 11/1986 | Kopesky | 70/175 |
| 5,234,029 | 8/1993 | Thomas et al. | 137/559 |
| 5,456,278 | 10/1995 | Morris et al. | 137/1 |
| 5,596,893 | 1/1997 | Stehling | 70/175 |
| 5,597,010 | 1/1997 | Hoffman et al. | 137/381 |
| 5,638,590 | 6/1997 | Silano | 29/254 |
| 5,664,597 | 9/1997 | Miskiewicz | 137/15 |
| 5,671,772 | 9/1997 | Bliss | 137/370 |

FOREIGN PATENT DOCUMENTS

| | | |
|---|---|---|
| 2380381 | 2/1978 | France . |
| 589268 | 6/1945 | United Kingdom . |

Primary Examiner—John Fox
Attorney, Agent, or Firm—Richard C. Litman

[57] ABSTRACT

A security device for a utility shutoff valve and a tool for inserting and removing the security device. The security device and tool are utilized for water and gas shutoff valves located underground that are accessed through a vertical access pipe. The invention is a cylindrical plug which is placed inside the access pipe, resting on top of the valve. The plug includes a grip resistant dummy valve handle which, when turned, causes the plug to rotate without having any effect on the valve. The plug is also very difficult to remove without the insertion/removal tool, comprising an inverted cup with a long handle, wherein the inside of the cup is lined with horizontal steel bristles. When the cup is placed over the top of the plug, the bristles enter corresponding holes in the dummy valve handle, allowing the plug to be lifted.

20 Claims, 5 Drawing Sheets

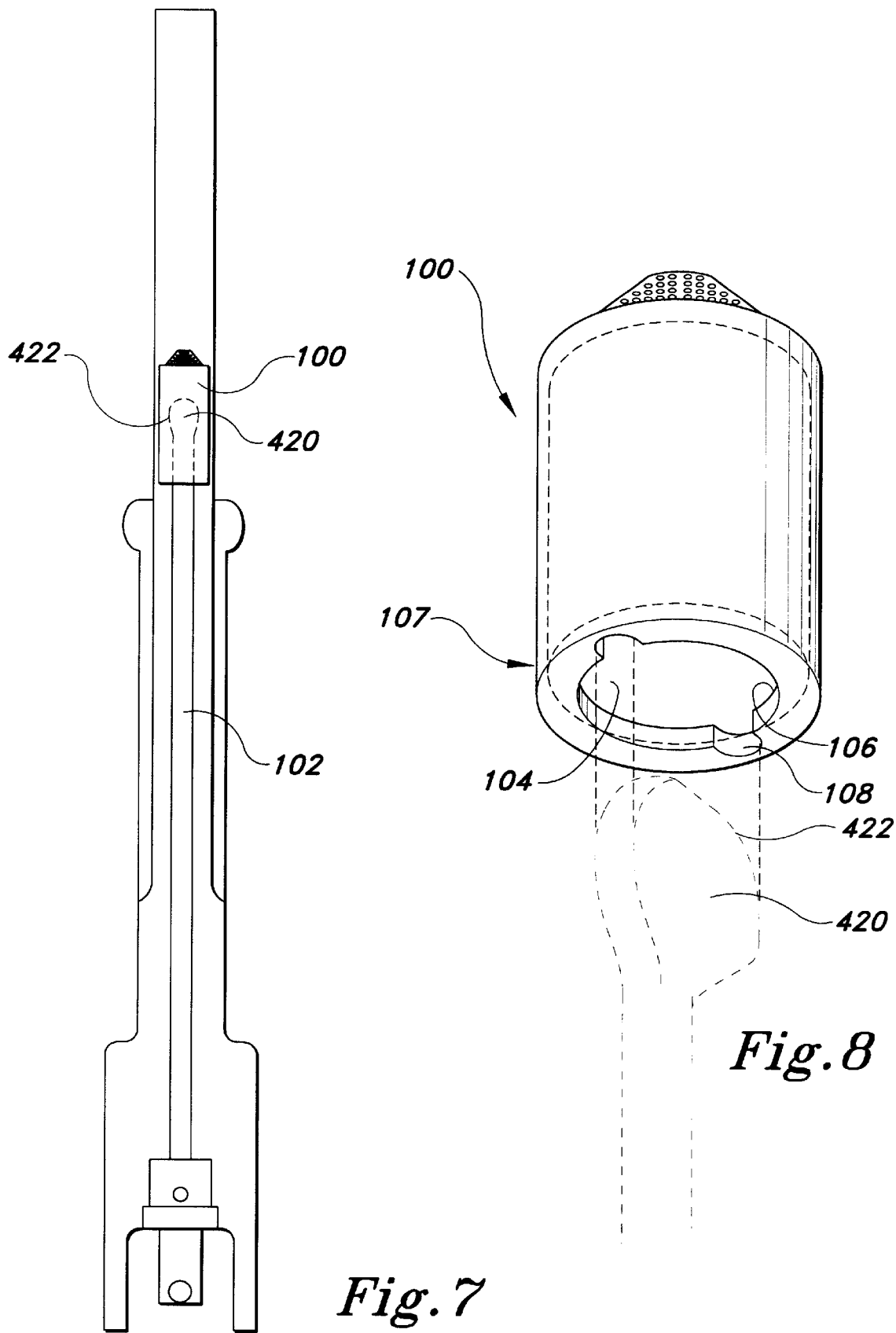

SECURITY DEVICE FOR UTILITY SHUTOFF VALVE

CROSS-REFERENCE TO RELATED APPLICATION

This application claims the benefit of U.S. Provisional Patent Application Serial No. 60/080,505, filed Apr. 2, 1998.

BACKGROUND OF THE INVENTION

1. Field of the Invention

The present invention relates to devices for securing valves from unauthorized tampering, more specifically, a dummy plug having a simulative valve handle which sits on top of and camouflages the functioning valve, and, a specialized steel-bristled tool for inserting and removing the plug.

2. Description of Related Art

Other inventors have attempted to develop satisfactory ways to prevent unauthorized tampering with water, gas, or other utility valves. One early example is English Pat No. 589,268, issued to James Laidlaw, disclosing a cover which could only be unscrewed by the use of a special key or tool. More recently, John R. Saporito disclosed in U.S. Pat. No. 3,797,286 a plug wherein a bolt locks the plug inside an access pipe, requiring a key to unlock it. Mr. Saporito's invention requires drilling a hole in the access pipe to accept the bolt. French Pat. No. 2,380,381 discloses another attempt to limit access to valves. Jeffrey G. Thomas and Lucas Brito describe in U.S. Pat. No. 5,234,029 a bracket which fits inside the access pipe, with the edges underneath a ledge in the pipe. An eyebolt is attached to the bracket, and passes through a hole in the pipe's cover. Placing a padlock through the eyehole locks the cover in place. This invention requires an access pipe with the appropriate ledge for the bracket.

Similar ideas have also been used for different applications, such as the refrigerant valve safety cap disclosed in U.S. Pat. No. 5,597,010, which was issued to John W. Hoffman. The cap screws down over the top of the valve access port. Unscrewing the valve requires a special tool wherein the end comprises several pegs dimensionally and positionally suited to fitting into several asymmetrically spaced holes on the top of the cap.

At least three inventors directed their ideas toward securing fire hydrant valves. U.S. Pat. No. 3,453,655, issued to Carlos M. Quinones, discloses an irregularly shaped nut wherein a bolt extends from the nut and engages a hole in a wall surrounding the nut. When the proper tool engages the nut, the bolt is withdrawn, allowing the nut to be turned. Albert B. Kopesky described in U.S. Pat. No. 4,620,428 an internal cylinder which attaches over the valve's nut, and an external cylinder which rotates freely with respect to the internal cylinder. Both the internal cylinder and the opening tool contain magnets. When the proper tool is used, the internal cylinder's magnet raises to engage the outer cylinder, causing both cylinders and the nut to rotate together. More recently, U.S. Pat. No. 5,596,893, issued to Henry J. Stehling et al., discloses an improved version of the same concept. All three of these inventions require modification to the valve to be protected. To retrofit an entire region with special replacement valves would result in a prohibitive and unnecessary cost to the utility users in such region.

William A Miskiewiez described in U.S. Pat. No. 5,664,597 a cover for fire hydrants. Although the cover is primarily directed to keeping fire hydrants visible and accessible in heavy snow, it generally describes the purpose of preventing unauthorized access to a hydrant. However, the current invention is directed towards preventing someone from finding a valve, teaching away from the '597 device which enables a user to find the hydrant.

Additional inventions were directed towards making it easier to open utility valves. U.S. Pat. No. 5,456,278, issued to Jeffrey B. Morris et al., discloses a folding bar designed to provide the appropriate reach and leverage to operate both gas and water valves. U.S. Pat. No. 5,638,590, issued to Peter Silano, discloses a tool for removing and replacing the operating nuts on underground valves. Lastly, U.S. Pat. No. 5,671,772, issued to William Charles Bliss, describes a telescoping access pipe.

None of the above inventions and patents, taken either singly or in combination, is seen to describe the instant invention as claimed.

SUMMARY OF THE INVENTION

The invention is a plug which functions both to impede access to a utility valve, and as a dummy valve simulative of an operational valve to confuse and fool the unauthorized user. The invention also includes a tool for removing the plug from an access pipe.

Most utility valves, such as water or gas valves, are located underground, and are operated by inserting a special tool through a vertical access pipe. The present invention is a plug which has a diameter slightly smaller than the access pipe it will be used to block. The plug is made from nonmagnetic material, such as aluminum. It is sufficiently dense so that it will not float. The bottom is made from rubber to protect the valve on which it sits. The top comprises a rectangular protrusion resembling a conventional utility valve handle. The sides of the dummy handle are substantially vertical and slightly inclined so that the dummy handle is narrower at the top than at the bottom. This shape makes the plug very difficult to grab with conventional hand tools. Additionally, the top is coated with a fluorocarbon polymer resin having a low coefficient of friction, such as the coating marketed under the trademark TEFLON, making it even more difficult to grab. Each end of the dummy handle includes several small horizontal holes dimensionally suited to receiving a steel bristle, used on the insertion/removal tool described below.

The removal tool comprises an inverted cup-shaped member with a long handle attached to the top. The inside of the cup is lined with steel bristles protruding horizontally. To remove the plug from an access pipe, one places the removal tool's cup over the dummy handle. The steel bristles enter the holes in the dummy handle, allowing one to lift the plug out of the access pipe.

The insertion/removal tool may include a hollow handle containing an ejector rod. Pushing the ejector rod down through the handle forces the plug away from the tool. To insert the plug, the installer lifts the plug using the tool as described above, and lowers it into the access pipe. Once the plug is sitting on the valve, the ejector rod is pushed while simultaneously lifting the tool. The tool will come out of the access pipe, leaving the plug to protect the valve.

In use, the plug sits on top of the valve to be protected, and appears to be the valve when viewed from the top of the access pipe. Anyone wishing to tamper with the valve will believe he is looking at the valve instead of the plug, and will attempt to turn the plug. The plug will turn in response to their efforts, but will merely spin harmlessly on top of the valve, having no effect on the condition or state of the valve.

Accordingly, it is a principal object of the invention to provide an inexpensive, simple, and effective way to protect utility valves from unauthorized tampering.

It is another object of the invention to provide a device for protecting utility valves, which does not require any modification to the valve's access pipe before it can protect the valve.

It is a further object of the invention to provide a dummy valve which will prevent unauthorized people from locating the real valve.

Still another object of the invention is to provide a means of inserting and removing the invention which will be easy for authorized people to use, but very difficult for unauthorized people to remove.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 7 is a side view of an alternate embodiment of the security device plug, shown in operation with a curb box having a valve handle extension, or shut-off rod.

FIG. 8 is a blow up of the security device plug depicted in FIG. 7.

Similar reference characters denote corresponding features consistently throughout the attached drawings.

DETAILED DESCRIPTION OF THE PREFERRED EMBODIMENT

The present invention is a securing device for utility shutoff valves, comprising a plug which fits inside a valve's access pipe and an insertion/removal tool for use with the plug.

Figure 4:
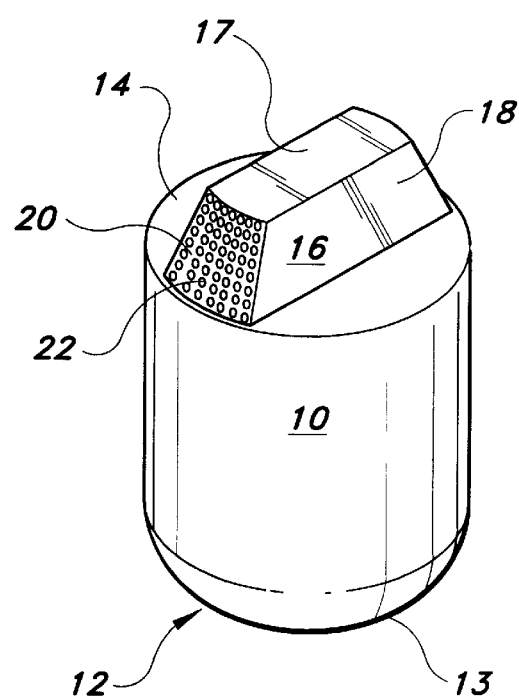
FIG. 4 is a top perspective view of the valve securing device showing its individual components in detail.

Referring to FIG. 4, plug 10 is cylindrical, and has a diameter slightly smaller than the access pipe to be blocked. Plug 10 is made from "non-magnetic" material sufficiently dense so that it will not float in water. The term "non-magnetic" shall mean not capable of drawing a significant magnetic force. A magnetic force equal to anything approaching the weight of plug 10 would be significant. A preferred and suggested material is aluminum. Plug 10 has a base 12 having a rubber pad 13 and a top 14. Seated upon top 14 is a dummy valve handle 16. For purposes of this application, the term "dummy valve handle" shall mean a security device which not only blocks access to a utility valve, such as a water or gas valve, but also which falsely appears to be a genuine utility valve handle when viewed from above.

Top 14 and dummy valve handle 16 are coated with a material that provides handle 16 with a surface having a low coefficient of friction. For purposes of this application, a "low coefficient of friction" shall mean that a properly sized and operable utility valve handle tool, such as a wrench, or a pair of pliers, or any other such tool not including the present invention, maintains a deficient grip upon top 14 and upon dummy valve handle 16. The preferred coating is graphite. Graphite, as the preferred coating material, is crucial to the optimum functioning of this invention because not only is graphite slippery, but also, it tends to cause adhesives that would otherwise be used by an unauthorized person to remove dummy valve handle 16, to malfunction. For example, a stick with super glue used to remove a graphite-coated plug 10 will typically fail because a fine layer of the graphite will shed, and thus leave plug 10 in place. Another example of a coating which provides a low coefficient of friction, but does not have quite the same shedding properties as graphite, is a fluorocarbon polymer resin, sometimes marketed under the trademark name TEFLON.

Opposing ends 18 and opposing sides 20 of dummy valve handle 16 are substantially vertical, but are angled slightly inward, so that handle 16 narrows from where it is seated, upon first top 14, to its top (dummy valve handle top 17, hereinafter). Each of sides 20 include a plurality of small substantially horizontal holes 22 dimensionally suited such that they are capable of receiving steel bristles 30. Alternate embodiments may be fabricated such that ends 20 and/or sides 18 contain holes 22.

In the preferred embodiment, bristles 30 vary in length so as to proximately match the angles and contours of sides 20, or, more broadly, the contours of any outer surface of dummy valve handle 16 having holes 22 for receipt of bristles 30. For example, bristles 30 are longer near upper portion 27 of cup-shaped member 26 than those opposite portion 27, so as to mirror the slope of sides 20, and to maximize the life expectancy of bristles 30, which are designed to slide over the surfaces of handle 16 and cam into holes 22. Bristles 30 preferably enter approximately ⅛ inch into each of holes 22. Anything significantly greater than ⅛ inch penetration causes undue bristle distortion and thus, wear and tear on those bristles which fail to enter holes 22.

Figure 3:
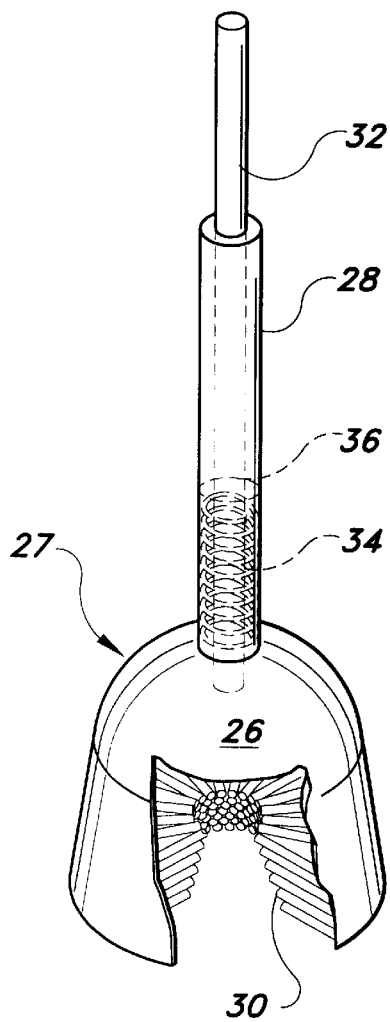
FIG. 3 is a perspective view of the insertion/removal tool for the securing device, partially fragmented to show its internal components in detail.

Referring to FIG. 3, the insertion/removal tool 24 comprises an inverted cup-shaped member 26, and a long handle 28, attached to member 26. The inside surface of member 26 is lined with bristles 30, which protrude radially inward with respect to member 26. Bristles 30 are dimensionally suited to fit into holes 22 on dummy valve handle 16.

In the preferred embodiment, the insertion/removal tool's handle 28 is hollow, and contains an ejector rod 32. The preferred embodiment includes a spring 34, disposed between upper portion 27 of cup 26 and flange 36. Spring 34 acts against flange 36 which is connected to rod 32, and therefore biases rod 32 upward. Thus, rod 32 may be plunged downward through handle 28 and into the cavity of cup 26 wherein the terminus of ejector rod 32 travels to a depth that breaks the inner-most radial plane of bristles 30 to make contact with dummy valve handle 16, thereby forcing handle 16 off of bristles 30. Spring 34, after being compressed by the plunged rod 32, decompresses when rod 32 is released, and thereafter biases plunger rod 32 back to its original extended position.

Figure 1:
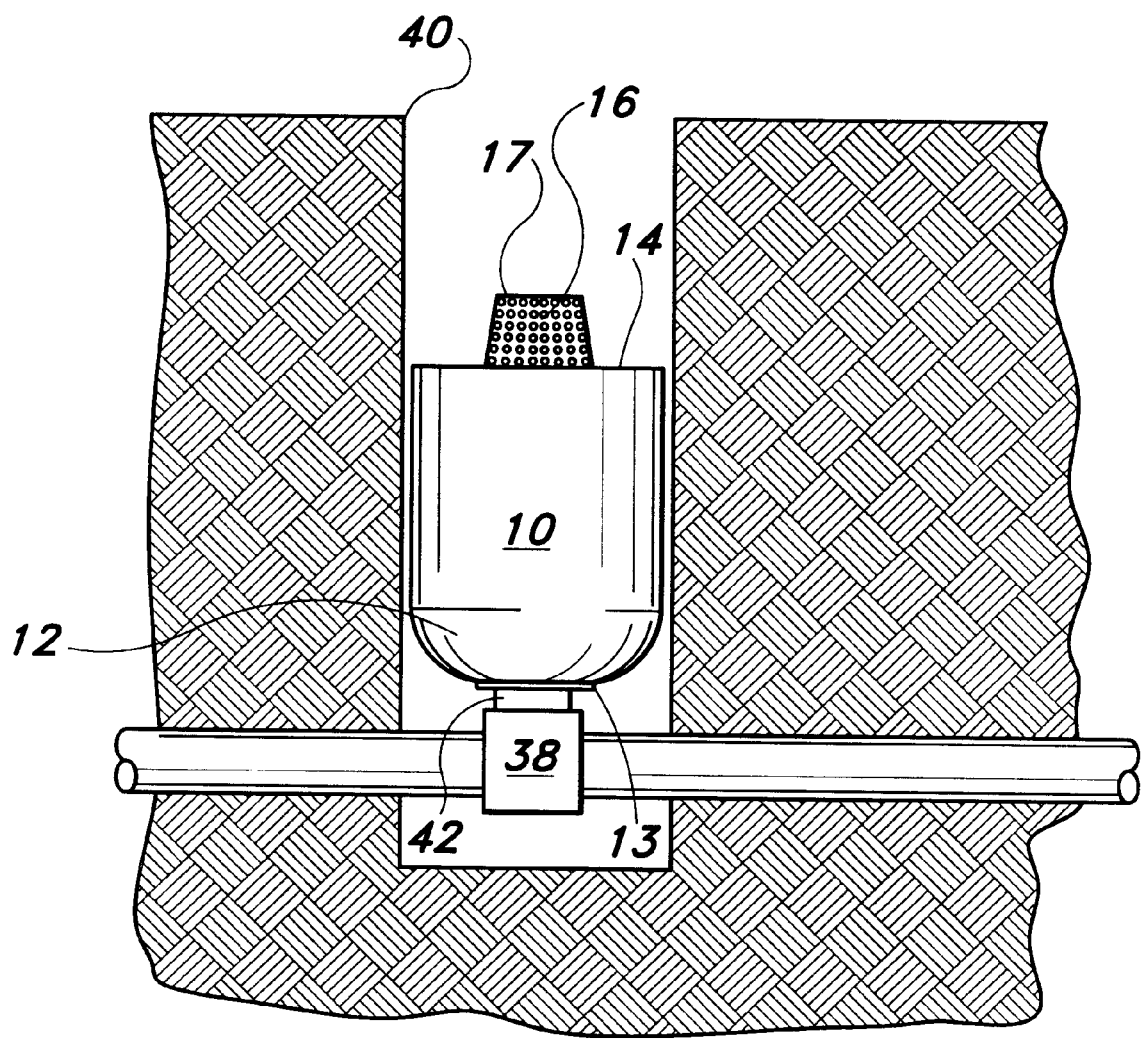
FIG. 1 is an environmental view of a securing device for a utility shutoff valve in use.
Figure 5:
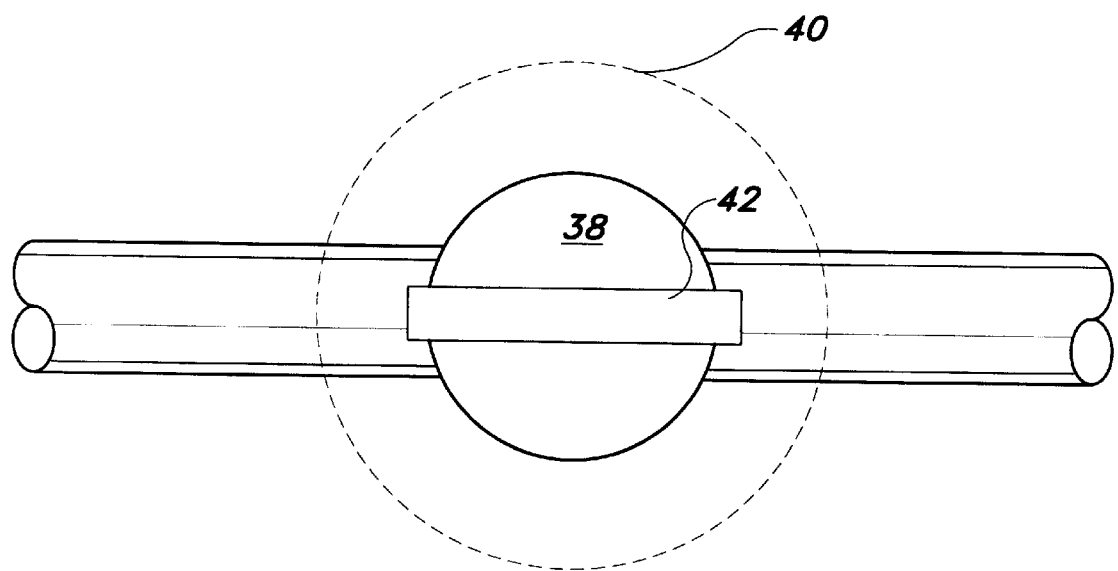
FIG. 5 is a top view of a typical utility valve.
Figure 6:
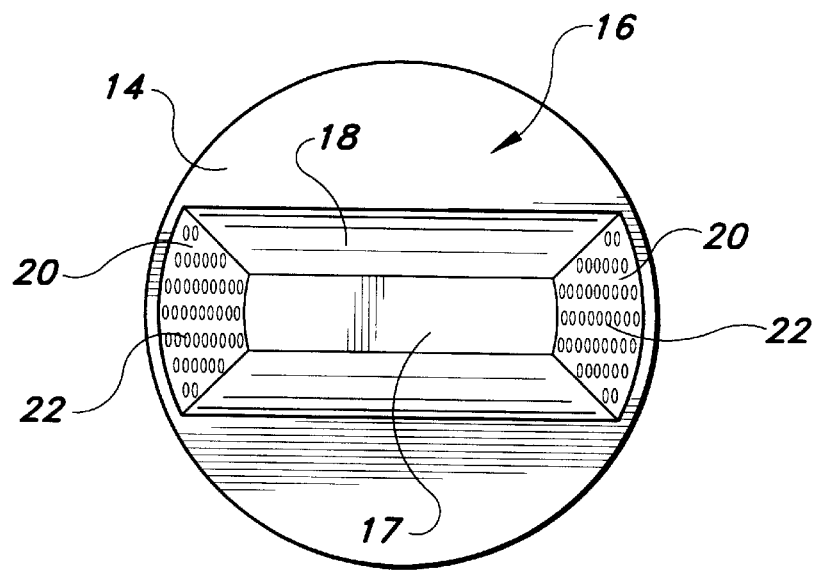
FIG. 6 is a top view of the dummy valve handle and plug.

Referring to FIG. 1, a genuine valve 38 is shown secured by plug 10 in valve 38's access pipe 40. Plug 10 rests on top of the genuine valve. Anyone wishing to tamper with valve 38 will see the grip resistant, dummy valve handle 16. As can be seen in FIGS. 5 and 6, first top 14 of plug 10, together with dummy valve handle top 17, closely resemble genuine valve 38 and a genuine valve handle 42. Referring back to FIG. 1, a fooled unauthorized user will attempt to turn the dummy valve handle 16, causing plug 10 to spin harmlessly inside access pipe 40, without any effect on the condition or state of valve 38. Such user will also find that in an attempt to remove plug 10 vertically, without the proper tool, the plug will remain unmoved. The graphite or fluorocarbon polymer resin coating on first top 14, and on dummy valve handle 16, combined with the upwardly narrowing angle of ends 18 and sides 20, make plug 10 very difficult to grab with bare hands, or even with pliers or any tool or object, for that matter, other than tool 24. The non-magnetic materials comprising plug 10 prevent the successful use of a magnet to vertically lift plug 10. The density of plug 10 prevents it from floating to the top of access pipe 40 when pipe 40 is filled with water.

Figure 2:
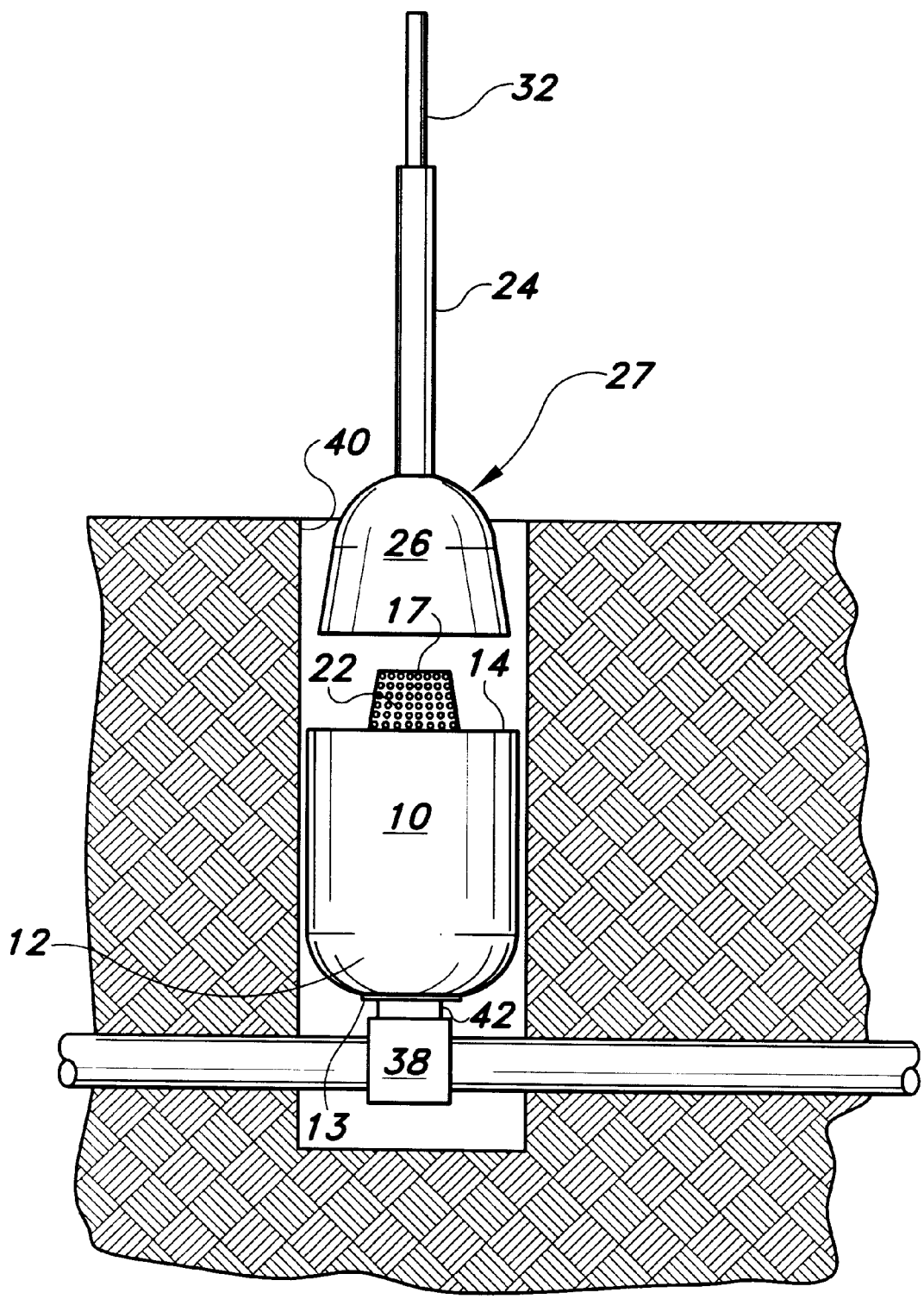
FIG. 2 is an environmental view of the utility shutoff valve securing device in a state of being removed from an access pipe.

Referring to FIG. 2, using the insertion/removal tool 24 requires placing cup 26 over first top 14 of plug 10. Steel bristles 30 enter holes 22 in camming succession, permitting tool 24 to lift plug 10 from pipe 40. Tool 24, including ejector rod 32, lifts plug 10, and inserts plug 10 into pipe 40 so that plug 10 rests on top of genuine valve 38. Raising tool 24 while simultaneously pushing ejector rod 32 will separate plug 10 from tool 24, causing plug 10 to remain seated on top of valve 38 when tool 24 is removed.

Referring to FIGS. 7 and 8, an alternate embodiment demonstrates that plug 10 may be modified, as shown by plug 100, to accommodate situations where the water or gas valve in a curb box is equipped with a valve handle extension 102, also known as a shut-off rod. Plug 100 is essentially the same device as plug 10, except it has a cavity 104 in its lower portion 107, causing minor differences in how plug 100 engages the genuine valve and its handle 420. Handle 420 contains ears 422. A cavity 104 of plug 100 has corresponding slots 108 cut out from an internal circumferential shelf 106 to receive ears 422 of handle 420. Once extension handle 420 is inside plug 100, plug 100 is given a quarter turn to lock plug 100 into a secure position, such that ears 422 rest upon shelf 106. When plug 100 is in the secure position, it will rotate freely about handle 420, as before, to confuse and to frustrate the potential utilities thief. Plug 100 is removed in the same manner as plug 10 except plug 100 must first be given a quarter turn so that slots 108 line up with ears 422 of handle 420.

It is to be understood that the present invention is not limited to the sole embodiments described above, but encompasses any and all embodiments within the scope of the following claims.

I claim:

1. A generally cylindrical plug for a valve, said plug comprising:
    a rubber base pad seated upon a utility valve;
    a dummy valve handle having a plurality of groups of small holes;
    a first top serving as a seat for said dummy valve handle; and
    a center section connecting said base pad and said first top.

2. The device according to claim 1, wherein said plug is made of a non-magnetic material.

3. The device according to claim 1, wherein said first top and said dummy valve handle have surfaces coated with a substance wherein said surfaces maintain a low coefficient of friction.

4. The device according to claim 3, wherein said substance is graphite.

5. The device according to claim 1, wherein said dummy valve handle is an angular protrusion extending from said seat of said first top, said protrusion having a plurality of opposing sides connecting said seat to a dummy valve handle top.

6. The device according to claim 5, wherein at least two of said groups are on said opposing sides.

7. The device according to claim 5, wherein the number of said sides is four.

8. The device according to claim 5, wherein said sides of said dummy valve handle are substantially vertical, but slightly angled such that said dummy valve handle narrows from said seat to said dummy valve handle top.

9. The device according to claim 1, wherein said plug further comprises:
    a lower portion having formed therein an opening connected to a cavity;
    a circumferential shelf inside said cavity wherein said shelf is proximate said opening;
    two opposing slots formed through said shelf, said slots capable of receiving a handle of a valve handle extension.

10. The device according to claim 8, wherein said plug further comprises:
    a lower portion having formed therein an opening connected to a cavity;
    a circumferential shelf inside said cavity wherein said shelf is proximate said opening; and
    two opposing slots formed through said shelf, said slots capable of receiving a handle of a valve handle extension.

11. A device for inserting and removing a dummy valve handle plug, comprising:
    an inverted cup-shaped member comprising:
        a hollow, semi-spherical upper portion having a central penetration; and
        an inside surface lined with substantially horizontally protruding steel bristles; and
    a substantially vertical hollow cylindrical handle attached to said upper portion, wherein a first end of said cylindrical handle circumscribes said penetration to define a continuous shoulder about said penetration.

12. The device according to claim 11, further comprising an ejector rod housed within said cylindrical handle and passing through said penetration.

13. The device according to claim 12, further comprising:
    a flange attached to said ejector rod; and
    a spring enclosed between said flange and said shoulder.

14. A security device for a utility valve, comprising:
    a plug, comprising:
        a rubber base pad seated upon a genuine utility valve;
        a center section connecting said base pad to a first top wherein said first top is a seat for a dummy valve handle;
        a dummy valve handle comprising an angular protrusion extending from said seat, said protrusion having a plurality of opposing sides connecting said seat to a dummy valve handle top, said opposing sides having formed therein a plurality of groups of small holes;
    an inverted cup-shaped member comprising:
        a hollow, semi-spherical upper portion having a central penetration;

an inside surface lined with substantially horizontally protruding steel bristles;

a substantially vertical hollow cylindrical handle attached to said upper portion, wherein an end of said cylindrical handle circumscribes said penetration to define a continuous shoulder about said penetration;

an ejector rod contained within said cylindrical handle and passing through said penetration;

a flange attached to said ejector rod;

a spring sandwiched between said flange and said shoulder;

wherein, said bristles penetrate said groups of small holes to connect said cup-shaped member to said plug, and said ejector rod passes through said cylindrical handle to disconnect said cup-shaped member from said plug.

15. The device according to claim 14, wherein said plug is made of a non-magnetic material.

16. The device according to claim 14, wherein said first top and said dummy valve handle have surfaces coated with a substance wherein said surfaces maintain a low coefficient of friction.

17. The device according to claim 16, wherein said substance is graphite.

18. The device according to claim 14, wherein at least two of said groups are on said opposing sides, and the number of said sides is four.

19. The device according to claim 14, wherein said sides of said dummy valve handle are substantially vertical, but slightly angled so that said dummy valve handle narrows from said seat to said dummy valve handle top.

20. The device according to claim 14, wherein said plug further comprises:

a lower portion having formed therein an opening connected to a cavity;

a circumferential shelf inside said cavity wherein said shelf is proximate said opening; and two opposing slots formed through said shelf, said slots capable of receiving a handle of a utility valve handle extension.

* * * * *